Jan. 23, 1945.  J. J. MAHONEY, JR  2,367,728
BALANCED CATHODE RAY SWEEP CIRCUIT
Filed Feb. 24, 1943
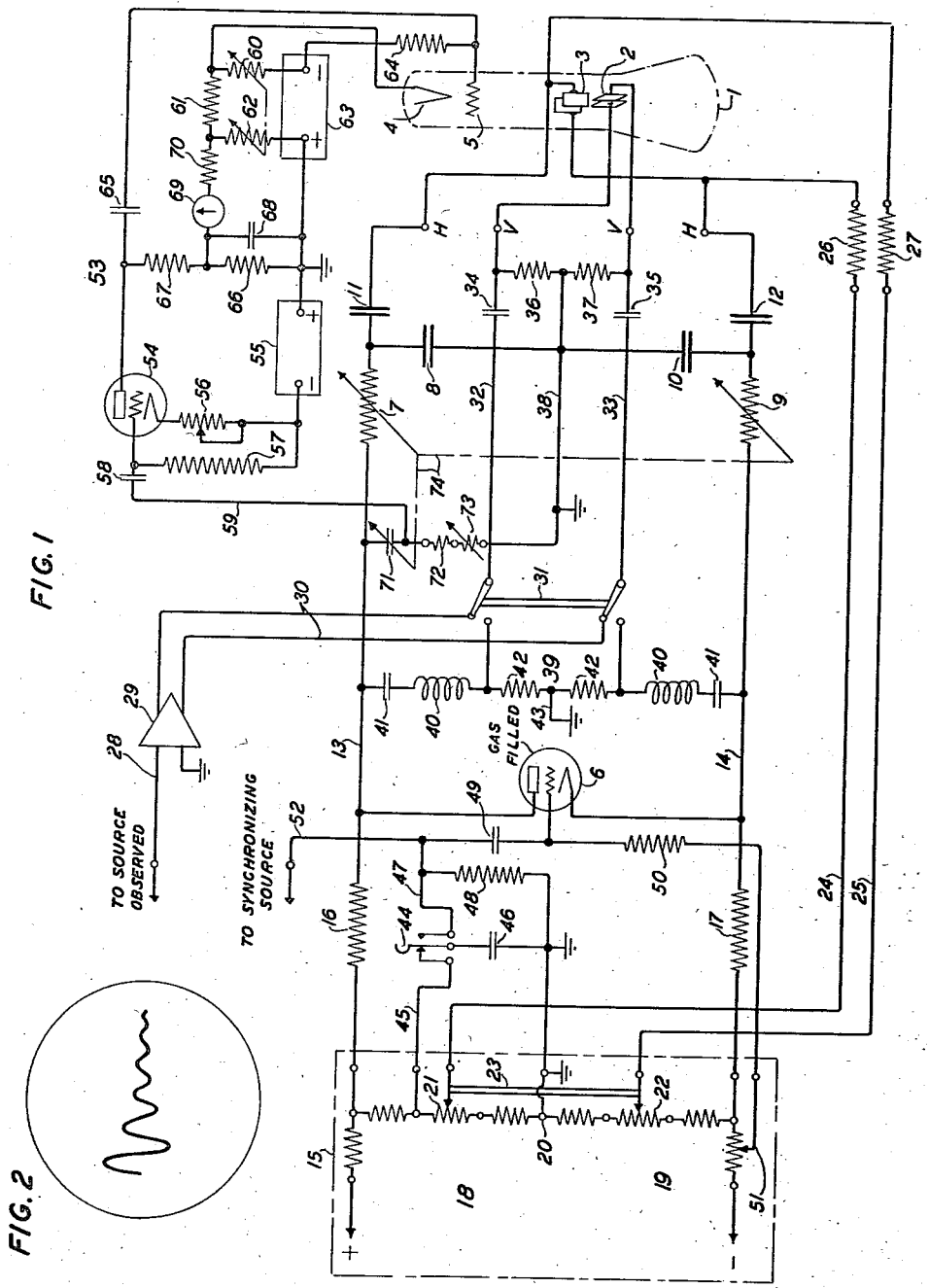
INVENTOR
J.J. MAHONEY, JR.
BY Walter M. Hill
ATTORNEY Patented Jan. 23, 1945

2,367,728

UNITED STATES PATENT OFFICE 2,367,728

BALANCED CATHODE RAY SWEEP CIRCUIT

John J. Mahoney, Jr., Lynbrook, N. Y., assignor to Bell Telephone Laboratories, Incorporated, New York, N. Y., a corporation of New York Application February 24, 1943, Serial No. 476,944

12 Claims. (Cl. 315—24)

This invention relates to cathode ray oscilloscopes and more particularly to sweep circuits therefor of the nonrecurrent type.

It is an object of this invention to provide a balanced sweep circuit for a cathode ray oscilloscope employing but a single grid-controlled gas-filled discharge tube, the circuits of which are extremely simple and easy to operate.

It is a further object of this invention to provide an extremely simple balanced sweep circuit for a cathode ray oscilloscope which contains its own timing means for calibration purposes.

A still further object of this invention is to provide a sweep circuit for a cathode ray oscilloscope in which the sweep action is immediately initiated upon the discharge of a gas-filled tube.

The foregoing objects are achieved by this invention by providing in combination a direct current power source, four resistors and two condensers connected in series, a grid-controlled gas-filled tube connected across a part of said series-connected circuit to discharge the condensers in series with two of said resistors, a cathode ray oscilloscope to be controlled having deflecting electrodes for controlling the sweep action of the cathode ray, a coupling means for connecting said electrodes to the extreme terminals of said two series-connected condensers whereby the discharge of said condensers will produce a voltage change on the cathode ray oscilloscope electrodes thereby effecting a sweep of the oscilloscope beam, another pair of electrodes in the oscilloscope for deflecting the beam at right angles to the direction of the sweep, an oscillatory circuit connected across the gas-filled discharge tube whereby oscillations are induced therein upon the discharge of said tube, and means permitting the coupling of the oscillatory circuit to the other pair of deflecting electrodes in the oscilloscope whereby the rate of sweep may be timed.

The invention may be better understood by referring to the accompanying drawing, in which:

Fig. 1 is a circuit diagram illustrating a preferred embodiment of the invention, and Fig. 2 represents a typical timing oscillogram produced by the timing circuit of this invention.

Referring now more particularly to Fig. 1, reference numeral 1 denotes a cathode ray oscilloscope having vertical and horizontal deflecting plates 2 and 3 respectively. An electron emitting cathode 4 is provided at one end of oscilloscope tube 1 and an electron beam intensity control grid 5 is provided for controlling the number of electrons per unit time reaching the screen of the oscilloscope. These various electrodes are conventional and require no further description. It is understood that other electrodes such as the conventional accelerating electrodes and focusing electrodes are also supplied but are deleted for the sake of clarity.

A sweep circuit is provided for the horizontal plates 3 of oscilloscope 1 by a combination of elements comprising a gas-filled grid-controlled discharge tube 6, resistancors 7 and 9 and condensers 8 and 10. This circuit is supplied with direct current from power source 15 through resistors 16 and 17. Before initiating the sweep, condensers 8 and 10 are charged to the voltage supplied from source 15 through the series circuit comprising resistors 16, 7, 9 and 17. Upon the ionization of gas-filled tube 6 this tube discharges and places a substantial short-circuit between conductors 13 and 14 which causes series-connected condensers 8 and 10 to discharge through their resistors 7 and 9.

The extreme terminals of condensers 8 and 10 are coupled to the horizontal deflecting electrodes 3 of oscilloscope tube 1 through coupling condensers 11 and 12, and horizontal deflecting electrode terminals H, H. It will be noted that the conductor joining condensers 8 and 10 is grounded through conductor 38. Condensers 8 and 10 are preferably of equal capacity and resistors 7 and 9 are also preferably of equal resistance. By reason of the grounded connection through conductor 38 and also by reason of the fact that the power source 15 is grounded at point 20, condenser 8 will take on a voltage charge equal to the drop in bleeder section 18 of power source 15 while condenser 10 will take on a voltage charge equal to the drop in bleeder section 19 of power source 15. Since the resistance of bleeder section 18 and the resistance of bleeder section 19 are designed to be equal, the voltage drops thereacross are also equal and consequently the voltages on condensers 8 and 10 are equal. This provides a perfectly balanced sweep voltage for oscilloscope 1 without the necessity of employing additional vacuum tubes together with their accompanying circuits. By properly proportioning the values of resistors 7 and 9 and the capacities of condensers 8 and 10, a reasonably linear sweep may be obtained as is well known. Potentiometers 21 and 22 are included in the bleeder resistance sections 18 and 19 of power source 15 and are simultaneously controlled by a gang control 23. These potentiometers provide beam positioning voltages through conductors 24, 25 and resistors 26 and 27 to the horizontal beam deflection electrodes 3.

Gas-filled grid-controlled discharge tube 6 is synchronized with the source of phenomenon under observation through circuit 52 and coupling condenser 49. Normal bias for the grid of this tube is provided through resistor 50 and potentiometer 51 which is in series with the high voltage bleeder circuit of power source 15. It will be noted that the cathode of this tube is connected through resistor 17 to one terminal of potentiometer 51.

The operation of the sweep circuit as thus far described is as follows: The grid bias voltage of gas-filled tube 6 is adjusted by means of potentiometer 51 to be sufficiently negative to prevent the tube from discharging. Upon receiving a positive synchronizing pulse through circuit 52 and coupling condenser 49 the grid of gas-filled tube 6 is driven sufficiently in the positive direction to cause the tube to ionize and place a substantial short between conductors 13 and 14. This immediately starts a discharge of condensers 8 and 10 through their resistors 7 and 9 and the gas-filled tube 6. The change in voltage on condensers 8 and 10 produces the sweep voltage on the horizontal deflecting electrodes 3 by reason of their coupling to these condensers through coupling condensers 11 and 12. As soon as condensers 8 and 10 are sufficiently discharged, gas-filled tube 6 will extinguish and the circuit will automatically reset itself.

The source of phenomenon to be observed is transmitted to the vertical deflector plates 2 over a conductor 28, through amplifier 29, circuit 30, conductors 32, 33, coupling condensers 34, 35 and vertical deflecting electrode terminals V, V. For this purpose double-pole, double-throw switch 31 must be in the position shown in Fig. 1. Resistors 36 and 37 are equal and provide electrical symmetry to ground over conductor 38 for the vertical deflector electrodes 2. It is understood, of course, that the signal received by conductor 28 from the source observed is associated with or otherwise synchronized with the synchronizing source connected to circuit 52 in a manner well known in the art.

The timing circuit comprising inductances 40, 40, capacitors 41, 41 and resistors 42, 42 serially connected across the conductors 13 and 14 is essentially a damped, series resonant network. Preferably, but not necessarily, inductors 40, 40 are equal and capacitors 41, 41 are equal. Resistors 42, 42 are equal. It will be noted that they are connected symmetrically about a grounded conductor 43 with the resistors connected directly to this grounded conductor. Prior to the discharge of gas-filled tube 6, condensers 41, 41 are charged serially to the voltage supplied by direct current source 15. Immediately upon the discharge of gas-filled tube 6 these two condensers 41, 41 discharge through gas-filled tube 6 in the same manner that sweep condensers 8 and 10 discharge through this tube. However, by reason of the inductive reactances of inductors 40, 40 this discharge will be oscillatory and will be damped largely by the resistances 42, 42. However, the oscillatory current so induced will produce alternating current voltages across resistors 42, 42 which may be used for timing purposes. These voltages will be symmetrical with respect to ground by reason of the symmetrical relationship of these two resistors with the grounded conductor 43. When using this timing circuit, switch 31 is operated into its downward position so as to transfer the vertical deflector plate circuit from circuit 30 to circuit 39 which embraces resistors 42, 42.

In order to manually initiate a discharge of gas-filled tube 6 for calibrating purposes, a discharging circuit including condenser 46 and resistor 48 is provided. The upper plate of condenser 46 is normally charged to a positive voltage with respect to ground through the normally closed contacts of switch 44 and conductor 45 connected to direct current power source 15. By operating switch 44 the charge on condenser 46 is discharged through conductor 47 and resistor 48 thereby swinging the control grid of gas-filled tube 6 in the positive direction by reason of the coupling condenser 49 being connected to resistor 48. This will immediately initiate a sweep by discharging condensers 8 and 10 and simultaneously begin the timing action of the timing circuit including condensers 41, 41, inductors 40, 40 and resistors 42, 42. With switch 31 in the downward position as previously stated, an oscillogram will be formed on the screen of oscilloscope 1 as shown in Fig. 2. It is important to note that this calibrating oscillogram will always have the form shown in Fig. 2 and will always start from the horizontal axis in the positive direction.

The velocity of the sweep may be controlled by varying the resistances of resistors 7 and 9 or the capacities of capacitors 8 and 10. In the specific embodiment herein disclosed, the resistors 7 and 9 are varied. It should be understood, however, that either the capacitors or the resistors, or both, may be varied and that these variations may be either in discrete steps or continuously variable. No matter which type of adjustment control is employed, it is necessary in order to maintain a properly balanced sweep that the resistances of resistors 7 and 9 should always be equal to each other and should the adjustment be made by varying the capacitors then their capacities should be kept equal. In Fig. 1 the resistances are varied simultaneously through a gang control 74.

In order to protect the oscilloscope screen, the cathode ray beam is kept cut off until the sweep is initiated by the reception of a positive pulse in the synchronizing circuit 52. In addition to protecting the screen, beam suppression also prevents fogging the photosensitive film, removes the distracting spot on the screen prior to the sweep and eliminates the confusing return trace. The desired beam suppression is accomplished by the beam release circuit generally denoted by reference numeral 53. This beam release circuit is more particularly described in applicant's copending application, Serial No. 476,945, now Patent No. 2,343,988 issued March 14, 1944, filed on even date herewith. Briefly, however, the circuit may be described as having a vacuum tube 54 supplied with space current from a direct current source 55 through series-connected resistors 66 and 67 and cathode resistor 56. The amount of space current taken by this tube is controlled by adjusting cathode resistor 56 which controls the grid bias through grid bias resistor 57.

Another direct current source 63 furnishes a bias voltage for the cathode ray oscilloscope grid 5 through a resistance network comprising series-connected resistors 60, 61 and 62. Resistors 60 and 62 are maintained substantially equal and are variable through a gang control as schematically disclosed in Fig. 1. The normal grid bias for cathode ray oscilloscope grid 5 appears across resistor 60 and a voltage of equal magnitude appears across resistor 62. Resistor 60 is varied in magnitude until the negative bias on grid 5 just blocks the beam in the cathode ray oscilloscope. Series-connected resistors 66 and 67 are preferably equal and a condenser 68 by-passes resistor 66 to ground. A direct current meter 69 preferably having a zero center is connected to resistors 62 and 66 through its series resistor 70 as shown. It will be evident that this connection will permit the meter to indicate the difference in the voltage drops appearing across resistors 62 and 66. Since the voltage drop across resistor 62 is equal to that across resistor 60, meter 69 will indicate zero voltage when the drop in resistor 66 is equal to the grid bias on grid 5 of cathode ray oscilloscope tube 1. For all other values of voltage drop across resistor 66, the readings of meter 69 will predetermine the bias of the oscilloscope grid 5 during the occurrence of a sweep.

The grid of vacuum tube 54 is coupled through coupling condenser 58 and conductor 59 to the junction between resistor 72 and capacitor 71 in the sweep circuit. The instant the sweep is initiated a strong negative pulse with respect to ground is transmitted over conductor 59 to the grid of vacuum tube 54 thereby substantially instantaneously blocking the space current through this tube. The result is that the voltage drop across resistor 67 disappears resulting in a positive pulse being transmitted over condenser 65 to grid 5. If the resistances of resistors 66 and 67 are equal, then the magnitude of this positive pulse is equal to the voltage drop across resistance 66. Since the voltage drop across resistance 66 can be varied at will by adjusting cathode resistor 56 it is evident that the indication of meter 69 will predetermine the intensity of the cathode ray beam in tube 1. This is of particular advantage when photographs are to be made of the oscillogram as the exposure can be accurately controlled for various sweep rates. It will thus be evident that the beam release circuit 53 not only releases the beam when the sweep is initiated but also controls the intensity of the beam.

In order to maintain the beam at substantially uniform intensity throughout the sweep the time constant of series-connected resistor 64 and capacitor 65 is made equal to the time constant of parallel connected resistor 66 and capacitor 68. In order to render the effect of resistor 67 on the time constant of capacitor 65, grid resistor 64 is made relatively large compared with the resistances of resistors 66 and 67. By this means the positive pulse voltage applied to the grid 5 of oscilloscope tube 1 is maintained substantially constant throughout the sweep period.

To insure that tube 54 will remain blocked throughout the sweep period the time constant of the series circuit 71, 72, 73 should be sufficiently long so that the grid of tube 54 continues to receive a blocking pulse throughout the sweep period. When the sweep is slowed down so that the sweep time is longer, the time constant of the series circuits 71, 72, 73 should be increased and this is accomplished by ganging series-connected condenser 71 with resistors 7 and 9 through the ganging control 74. One of the series resistors, for example resistor 73, may also be made adjustable for further adjustment of the time constant and also to adjust the cut-off voltage applied to tube 54.

What is claimed is:

1. In a circuit for a cathode ray tube of the type employing electrostatic beam-deflecting plates including vertical deflecting plates and horizontal sweep deflecting plates, a balanced to ground sweep circuit therefor comprising in combination a grid-controlled gas-filled discharge tube having an anode, a cathode and a grid, a source of direct current, a resistor connecting a positive terminal of said source to said anode, another resistor connecting a negative terminal of said source to said cathode, a series circuit comprising in sequence a resistor, two capacitors and a second resistor, said series circuit being connected to said anode and said cathode whereby said capacitors are normally charged from said source, a grounded conductor connected to the junction between said two capacitors, terminals connected to the ungrounded sides of said two capacitors for connection to the cathode ray sweep deflecting plates, an input circuit for said grid including a bias means for normally blocking ignition of the gas-filled tube whereby a positive pulse received by said grid input circuit will cause the discharge of said two capacitors through said gas-filled tube to produce the sweep voltage for the cathode ray beam.

2. In a circuit for a cathode ray tube of the type employing electrostatic beam-deflecting plates including vertical deflecting plates and horizontal sweep deflecting plates, a balanced to ground sweep circuit therefor comprising in combination a grid-controlled gas-filled discharge tube having an anode, a cathode and a grid, a source of direct current, a mid-voltage connection to ground for said source, a resistor connecting a positive terminal of said source to said anode, another resistor connecting a negative terminal of said source to said cathode, a series circuit comprising in sequence a resistor, two capacitors and a second resistor, said series circuit being connected to said anode and said cathode whereby said capacitors are normally charged from said source, a grounded conductor connected to the junction between said two capacitors, terminals connected to the ungrounded sides of said two capacitors for connection to the cathode ray sweep deflecting plates, an input circuit for said grid including a bias means for normally blocking ignition of the gas-filled tube whereby a positive pulse received by said grid input circuit will cause the discharge of said two capacitors through said gas-filled tube to produce the sweep voltage for the cathode ray beam.

3. In a circuit for a cathode ray tube of the type employing electrostatic beam-deflecting plates including vertical deflecting plates and horizontal sweep deflecting plates, a balanced to ground sweep circuit therefor comprising in combination a grid-controlled gas-filled discharge tube having an anode, a cathode and a grid, a source of direct current, a resistor connecting a positive terminal of said source to said anode, another resistor connecting a negative terminal of said source to said cathode, a series circuit comprising in sequence a resistor, two capacitors and a second resistor, said series circuit being connected to said anode and said cathode whereby said capacitors are normally charged from said source, a grounded conductor connected to the junction between said two capacitors, coupling capacitors coupling the ungrounded sides of said two capacitors to the cathode ray sweep deflecting plates, an input circuit for said grid including a bias means for normally blocking ignition of the gas-filled tube whereby a positive pulse received by said grid input circuit will cause the discharge of said two capacitors rough said gas-filled tube to produce the sweep
ltage for the cathode ray beam.

4. In a circuit for a cathode ray tube of the
pe employing electrostatic beam-deflecting
ates including vertical deflecting plates and
rizontal sweep deflecting plates, a balanced to
ound sweep circuit therefor comprising in combination a grid-controlled gas-filled discharge
be having an anode, a cathode and a grid, a
urce of direct current, a mid-voltage connection to ground for said source, a resistor connecting a positive terminal of said source to said
iode, another resistor connecting a negative terinal of said source to said cathode, a series circit comprising in sequence a resistor, two capacitors and a second resistor, said series circuit
ing connected to said anode and said cathode
hereby said capacitors are normally charged
om said source, a grounded conductor connected to the junction between said two capacitors,
upling capacitors coupling the ungrounded side
said two capacitors to the cathode ray sweep
flecting plates, an input circuit for said grid
cluding a bias means for normally blocking
nition of the gas-filled tube whereby a positive
lse received by said grid input circuit will cause
e discharge of said two capacitors through said
s-filled tube to produce the sweep voltage for
e cathode ray beam.

5. The combination in accordance with claim
and a sweep velocity timing circuit comprising
resonant network tuned to a predetermined
ning frequency, a resistor connected with said
sonant network to form a resistance load therer, connections from said resonant circuit to
e anode and cathode of the discharge tube
iereby the resonant network may be excited
oscillate at its natural period upon the disarge of said tube, means coupling the said reistance load of the resonant network to the veral deflecting plates in the cathode ray tube
iereby the oscillatory voltages developed thereross will cause a vertical deflection of the beam
the oscillatory frequency for timing the velity of the sweep.

6. The combination in accordance with claim
ind a sweep velocity timing circuit comprising
resonant network tuned to a predetermined
ning frequency, a resistor connected with said
sonant network to form a resistance load there, connections from said resonant circuit to
e anode and cathode of the discharge tube
iereby the resonant network may be excited to
cillate at its natural period upon the discharge
said tube, means coupling the said resistance
d of the resonant network to the vertical decting plates in the cathode ray tube whereby
e oscillatory voltages developed thereacross will
ise a vertical deflection of the beam at the
iillatory frequency for timing the velocity of
e sweep.

7. The combination in accordance with claim
ind a sweep velocity timing circuit comprising
resonant network tuned to a predetermined
ling frequency, a resistor connected with said
onant network to form a resistance load there, connections from said resonant circuit to
anode and cathode of the discharge tube
ereby the resonant network may be excited to
illate at its natural period upon the discharge
said tube, means coupling the said resistance
d of the resonant network to the vertical de:ting plates in the cathode ray tube whereby
oscillatory voltages developed thereacross
l cause a vertical deflection of the beam at the
oscillatory frequency for timing the velocity of
the sweep.

8. The combination in accordance with claim 4
and a sweep velocity timing circuit comprising a
resonant network tuned to a predetermined timing frequency, a resistor connected with said resonant network to form a resistance load therefor,
connections from said resonant circuit to the
anode and cathode of the discharge tube whereby the resonant network may be excited to oscillate at its natural period upon the discharge of
said tube, means coupling the said resistance load
of the resonant network to the vertical deflecting plates in the cathode ray tube whereby the
oscillatory voltages developed thereacross will
cause a vertical deflection of the beam at the
oscillatory frequency for timing the velocity of
the sweep.

9. The combination in accordance with claim 1
and a sweep velocity timing circuit comprising a
balanced series resonant network including two
series resonant circuits each comprising an inductor and a capacitor tuned to the same predetermined timing frequency, a resistance load
comprising two equal series-connected resistors
connecting the two series resonant circuits into
a balanced series resonant network, said balanced
series resonant network being connected to the
anode and cathode of the discharge tube whereby
the resonant network may be excited to oscillate at its natural period upon the discharge of
said tube, means coupling the resistance load of
the resonant network to the vertical deflecting
plates in the cathode ray tube whereby the oscillatory voltages developed thereacross will cause
a vertical deflection of the beam at the oscillatory
frequency for timing the velocity of the sweep.

10. The combination in accordance with claim 2
and a sweep velocity timing circuit comprising a
balanced series resonant network including two
series resonant circuits each comprising an inductor and a capacitor tuned to the same predetermined timing frequency, a resistance load
comprising two equal series-connected resistors
connecting the two series resonant circuits into
a balanced series resonant network, said balanced
series resonant network being connected to the
anode and cathode of the discharge tube whereby the resonant network may be excited to oscillate at its natural period upon the discharge
of said tube, means coupling the resistance load
of the resonant network to the vertical deflecting plates in the cathode ray tube whereby the
oscillatory voltages developed thereacross will
cause a vertical deflection of the beam at the
oscillatory frequency for timing the velocity of
the sweep.

11. The combination in accordance with claim
3 and a sweep velocity timing circuit comprising
a balanced series resonant network including two
series resonant circuits each comprising an inductor and a capacitor tuned to the same predetermined timing frequency, a resistance load
comprising two equal series-connected resistors
connecting the two series resonant circuits into a
balanced series resonant network, said balanced
series resonant network being connected to the
anode and cathode of the discharge tube whereby
the resonant network may be excited to oscillate
at its natural period upon the discharge of said
tube, means coupling the resistance load of the
resonant network to the vertical deflecting plates
in the cathode ray tube whereby the oscillatory
voltages developed thereacross will cause a vertical deflection of the beam at the oscillatory frequency for timing the velocity of the sweep.

12. The combination in accordance with claim 4 and a sweep velocity timing circuit comprising a balanced series resonant network including two series resonant circuits each comprising an inductor and a capacitor tuned to the same predetermined timing frequency, a resistance load comprising two equal series-connected resistors connecting the two series resonant circuits into a balanced series resonant network, said balanced series resonant network being connected to the anode and cathode of the discharge tube whereby the resonant network may be excited to oscillate at its natural period upon the discharge of said tube, means coupling the resistance load of the resonant network to the vertical deflecting plates in the cathode ray tube whereby the oscillatory voltages developed thereacross will cause a vertical deflection of the beam at the oscillatory frequency for timing the velocity of the sweep.

JOHN J. MAHONEY, Jr.